US005466657A

United States Patent [19]

Egashira et al.

[11] Patent Number: 5,466,657

[45] Date of Patent: Nov. 14, 1995

[54] HEAT TRANSFER IMAGE-RECEIVING SHEETS

[75] Inventors: Noritaka Egashira; Yoshinori Nakamura, both of Tokyo, Japan

[73] Assignee: Dai Nippon Insatsu Kabushiki Kaisha, Japan

[21] Appl. No.: 537,132

[22] Filed: Jun. 13, 1990

[30] Foreign Application Priority Data

Jun. 16, 1989 [JP] Japan .................................... 1-152299

[51] Int. Cl.[6] .............................. B41M 5/20; B41M 5/24; B32B 3/00

[52] U.S. Cl. .......................... 503/227; 428/195; 428/447; 428/913; 428/914

[58] Field of Search ............................ 503/227; 428/195, 428/447, 913, 914

[56] References Cited

U.S. PATENT DOCUMENTS 4,626,256 12/1986 Kawasaki et al. .......................... 8/471
4,839,338 6/1989 Marbrow ................................. 503/227

FOREIGN PATENT DOCUMENTS 332204 9/1989 European Pat. Off. .
61-106293 5/1986 Japan .
63-302091 12/1988 Japan .
64-34792 2/1989 Japan .

*Primary Examiner*—Patrick J. Ryan
*Assistant Examiner*—Elizabeth Evans
*Attorney, Agent, or Firm*—Parkhurst Wendel & Rossi

[57] ABSTRACT

The present invention provides a heat transfer image-receiving sheet showing improved releasability at the time of heat-sensitive printing, which includes a substrate sheet, a dye-receiving layer formed on at least one side of the substrate sheet and a release layer formed on the surface of the dye-receiving layer and in which the release layer consists essentially of a mixture of a reactive curing type of release agent with an unreactive type of release agent.

9 Claims, No Drawings

HEAT TRANSFER IMAGE-RECEIVING SHEETS

BACKGROUND OF THE INVENTION

The present invention relates to a heat transfer image-receiving or imageable sheet and, more particularly, to a heat transfer imageable sheet having improved releasability at the time of heat transfer.

Heretofore, various heat transfer techniques have been known in the art, including sublimation type transfer systems wherein a sublimable dye as a recording material is carried on a substrate sheet such as paper or a plastic film to make a heat transfer sheet, which is in turn overlaid on paper or a plastic film containing a dye-receiving layer to make various full-color images thereon.

In such systems, thermal heads of printers are used as heating means to transfer three-, four-, or more-colored dots to heat transfer image-receiving sheets, thereby reproducing full-color images of manuscripts with the multicolor dots.

According to the above heat transfer systems, imaging is achieved by overlaying a dye layer of a heat transfer sheet on a dye-receiving layer of a heat transfer image-receiving sheet so as to oppose each other and heating them by a thermal head to transfer a dye to the dye-receiving layer, and the dye and dye-receiving layers are both formed of thermoplastic resin. Thus, problems with these systems are that the two layers are so fused together at the time of heat transfer that difficulty is encountered in their separation, causing damage to the resulting image.

In order to provide a solution to such problems, it has been proposed to add a release agent to the dye-receiving layer and to bleed it out onto the surface of the dye-receiving layer to form a release layer.

When a liquid or waxy release agent is used to this end, it is likely to contaminate other articles or cause discoloration, etc. of images. As an alternative, it has thus been proposed to use a reactive curing type of release agent.

With this release agent, the problems as referred to above are solved to some extent as a result that after the formation of a dye-receiving layer, heating is carried out to bleed out the release agent contained in the dye-receiving layer onto its surface, whereby a thin, crosslinked film of the release agent is formed on the surface of the dye-receiving layer. However, when there is a certain interval of time between forming the dye-receiving layer and forming the release layer for reasons of production process, for instance, when the two layers are formed with separate equipment in separate spots, the reactive curing type of release agent in the dye-receiving layer undergoes gradual reaction and curing, without bleeding of the release agent, in the meantime. For this reason, there arises a problem that even when heat treatment is thereafter applied to form the release layer, any release layer of sufficient releasability cannot be obtained at all.

It is, therefore, a primary object of the present invention to provide a heat transfer image-receiving sheet having improved releasability, and which is retained with no drop even when there is a certain interval of time between forming a dye-receiving layer and forming a release layer.

SUMMARY OF THE INVENTION

The above object is accomplished by the present invention, which provides a heat transfer image-receiving sheet comprising a substrate sheet, a dye-receiving layer formed on at least one major side of said substrate sheet and a release layer formed on the surface of said dye-receiving layer, characterized in that said release layer consists essentially of a mixture of a reactive curing type of release agent with an unreactive type of release agent.

The incorporation of a combination of the reactive curing type of release agent with the unreactive type of release agent into the dye-receiving layer ensures that even if a part of the reactive curing type of release agent is cured in the dye-receiving layer when there is a certain interval of time between forming the dye-receiving layer and forming the release layer, then that part is made up for by the unreactive type of release agent. It is thus possible to provide a heat transfer image-receiving sheet of improved releasability, which is retained with no drop even when the release layer is formed after the lapse of some time.

ILLUSTRATIVE EXPLANATION OF THE INVENTION

The present invention will now be explained in greater detail with reference to its preferable embodiments.

The heat transfer image-receiving sheet of the present invention comprises a substrate sheet, a dye-receiving layer formed on at least one major side of said substrate sheet and a release layer formed on the surface of said dye-receiving layer.

No limitation is placed on the substrate sheets used in the present invention. For instance, use may be made of various types of paper such as synthetic paper (based on polyolefin, polystyrene, etc.), fine paper, art paper, coated paper, cast coated paper, wall paper, backing paper, synthetic resin or emulsion impregnated paper, synthetic rubber latex impregnated pater, synthetic resin intercalated paper, paper board and cellulose fiber paper; and various kinds of plastic films or sheets based on, e.g., polyolefin, polyvinyl chloride, polyethylene terephthalate, polystyrene, polymethacrylate and polycarbonate. Use may also be made of white, opaque films or foamed sheets obtained from such synthetic resins to which white pigments and fillers are added.

Any desired combination of the above substrate sheets may be laminated together. Examples of typical laminates are combined cellulose fiber paper/synthetic paper and combined cellulose fiber paper/plastic films or sheets. The substrate sheet or sheets may have any desired thickness, for instance, a thickness of generally about 10 to 300 μm.

If the substrate sheet is poor in its adhesion to the dye-receiving layer to be formed on its major side, then it is preferable that it be primer- or corona discharge-treated on its surface.

The dye-receiving layer to be provided on the major side of the substrate sheet is to receive a sublimable dye coming from a heat transfer sheet and maintain the resulting image.

The resins used to form the dye-receiving layer may include, for instance, polyolefinic resins such as polypropylene; halogenated polymers such as polyvinyl chloride and polyvinylidene chloride; vinyl polymers such as polyvinyl acetate and polyacrylic ester; polyester resins such as polyethylene terephthalate and polybutylene terephthalate; polystyrene resin; polyamide resin; copolymeric resins such as copolymers of olefins such as ethylene and propylene with other vinylic monomers; ionomers; cellulosic resins such as cellulose diacetate; and polycarbonate. Particular preference is given to vinylic resin and polyester risin.

The heat transfer image-receiving sheet of the present invention may be obtained in the following manner. With such suitable means as gravure printing, screen printing or reverse roll coating using gravure, the substrate sheet is coated on at least one major side with a solution or a dispersion in which such a resin as above mentioned is dissolved or dispersed with additives such as release agents in a suitable organic solvent or water, and drying and heating the substrate sheet to form a dye-receiving layer and a release layer.

When forming the above dye-receiving layer, pigments or fillers such as titanium oxide, zinc oxide, kaolin, clay, calcium carbonate and finely divided silica may be added thereto with a view to improving the whiteness of the dye-receiving layer, thereby making further improvements in the definition of the transferred image.

The present invention is characterized by using the reactive curing type of release agent in combination with the unreactive type of release agent so as to impart releasability to the dye-receiving layer.

The reactive curing type of release agents used in the present invention can undergo reaction or react with a separate curing agent (a catalyst) to form a crosslinked film and may include silicone oils and phosphate or fluorine base surface active agents, all having various functional groups such as amino, hydroxyl, epoxy and carboxyl groups. Particular preference is given to silicone oils which may typically include those modified by epoxy, amino, carboxyl, alcohol, epoxy/polyether, polyether and the like. More illustratively, the following reactive silicone may be used.

Amino-modified silicone

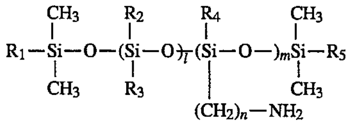

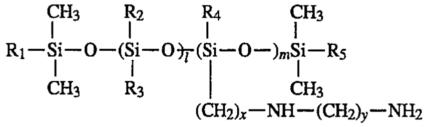

Epoxy-modified silicone

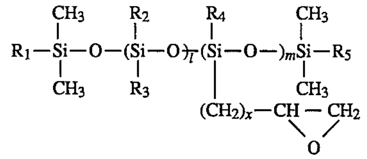

Isocyanate-modified silicone

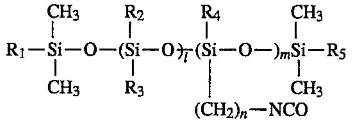

Alcohol-modified silicone

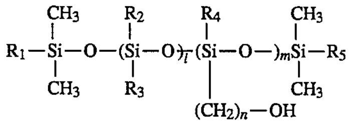

-continued

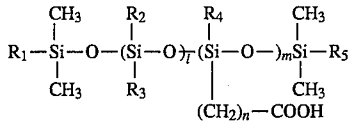

In the above formulae, $R_1$ to $R_5$ each are primarily a methyl group, but may stand for other groups such as alkyl and phenyl groups, with the suffixes l, m, n, x and y each indicating an integer of 1 or more, which may be determined depending upon the molecular weight of the release agent. It is noted that the atomic groups shown by l and n are randomly copolymerized.

Examples of other reactive curing types of release agents are compounds containing at least one alkoxylsilyl group along with various ractive groups represented by amino, epoxy, hydroxyl, thioalcohol, carboxyl, vinyl and other groups. Some preferable examples are as follows:

$H_2N(CH_2)_2NH(CH_2)_3Si(OCH_3)_2(CH_3)$ $H_2N(CH_2)_2NH(CH_2)_3Si(OC_2H_5)_2(CH_3)$ $H_2N(CH_2)_2NH(CH_2)_3Si(OCH_3)_3$ $H_2N(CH_2)_2NH(CH_2)_3Si(OC_2H_5)_3$ $H_2N(CH_2)_3Si(OCH_3)_3$ $H_2N(CH_2)_3Si(OC_2H_5)_3$

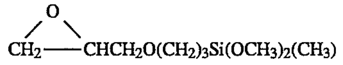

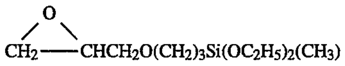

$HS(CH_2)_3Si(OCH_3)_3$ $HS(CH_2)_3Si(OC_2H_5)_3$ $H_2N(CH_2)_2NHCH_2$—Ph—$CH_2CH_2Si(OCH_3)_3$

Still another silicone compound may be used, which can be polymerized and cured by making use of the above exemplified reactive functional groups to introduce therein a vinyl or (meth)acrylic group. Use may further be made of hydrogen or vinyl polydimethylsiloxanes having the following general formula:

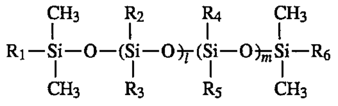

wherein at least one of $R_1$ to $R_6$ is a hydrogen atom or a vinyl group.

Such reactive silicones as referred to above may be cured with each other or by other crosslinkers, catalysts or the like through their functional groups.

As the unreactive type of release agents used in the present invention, mention is made of silicone oils, phosphate or fluorine base surface active agents and the like, generally available and heretofore known in the art. In particular, silicone oils are desired. For instance, use may be made of the reactive silicone compounds which are referred to above, but either have no reactive groups or their reactive groups have been allowed to react with other compounds block them. Copolymers of the above silicone compounds having a vinyl or (meth)acryloyl group with other monomers may also be used. Furthermore, use may be made of silicone compounds which contain a reactive group but is not cured under the conditions for forming the release layer.

For use, the reactive curing type of release agents and the unreactive type of release agents should preferably be mixed together in a mixing weight ratio of 20 to 80:80 to 20.

Preferably, the total amount of these release agents added should be in a range of 0.5 to 30 parts by wight per 100 parts by eight of the dye-receiving layer forming resin. When it departs from that range, there may arise problems that the dye layer of a heat transfer sheet fuses with the dye-receiving layer, or printing sensitivity drops.

Such release agents are added to a coating liquid for forming the dye-receiving layer. Upon heated or otherwise treated at the time of forming the dye-receiving layer, the receiving layer to form a release layer.

The thus formed dye-receiving layer may have any desired thickness, but is generally 1 to 50 μm in thickness. Such a dye-receiving layer should preferably be in a continuous film form, but may be formed into a discontinuous film with the use of a resin emulsion or dispersion.

By the appropriate selection of substrates sheets, the imageable sheets of the present invention may find use in various fields including heat transfer-recordable heat transfer sheets or cards and sheets for forming a transmission type of manuscript.

In the imageable sheet of the present invention, a cushioning layer may be additionally interposed between the substrate sheet and the dye-receiving layer, thereby making it possible to reduce noise at the time of printing and transfer and record thereon an image corresponding to image information with good reproducibility.

The cushioning layer may be formed of a suitable material such as plyurethane resin, acrylic resin, polyethylenical resin, butadiene rubber and epoxy resin, and may preferably have a thickness of about 2 to 20 μm.

The substrate sheet may also be provided on its back side with a lubricating layer, which may be formed of a suitable material such as (meth)acrylate resin such as methyl (meth-)acrylate and vinylic copolymers such as vinyl chloride/vinyl acetate copolymers.

Moreover, the image-receiving sheet of the present invention may be provided with a detection mark, which serves very well, for instance, for the alignment of a heat transfer sheet with the image-receiving sheet. By way of example, a detection mark capable of being sensed by a phototube detector may be provided on the back side or elsewhere of the substrate sheet by printing or other means.

The heat transfer sheet used for heat transfer to be carried out with the heat transfer image-receiving sheet of the present invention includes paper or a polyester film on which a dye layer containing a sublimable dye is provided. For the present invention, conventional, known heat transfer sheets may be all be used without making any modification thereto.

A heat energy applying means at the time of heat transfer, a conventional applicator means hitherto known in the art may be used. For instance, the desired object is successfully achievable by the application of a heat energy of about 5 to 100 $mJ/mm^2$ for a controlled recording time with such recording hardware as a thermal printer (e.g., Video Printer VY-100 made by Hitachi Co. Ltd.).

According to the present invention as described above, the incorporation of a combination of the reactive curing type of release agent with the unreactive type of release agent into the dye-receiving layer ensures that even if a part of the reactive curing type of release agent is cured in the dye-receiving layer when there is a certain interval of time between forming the dye-receiving layer and forming the release layer, then that part is made up for by the unreactive type of releasing agent. It is thus possible to provide a heat transfer image-receiving sheet of improved releasability, which is retained with no drop even when the release layer is formed after the lapse of some time.

The present invention will now be explained more illustratively but not exclusively with reference to the following examples and comparative examples, in which unless otherwise specified, "parts" and "%" are given on weight basis.

EXAMPLE 1

As the substrate sheet, synthetic paper having a thickness of 150 μm (Yupo-FRG-150 made by Oji Yuka Co., Ltd., Japan) was used. A coating liquid composed of the following ingredients was coated on one side of this paper in an amount of 10.0 $g/m^2$ on dry basis by means of a bar coater. That paper was pre-dried in a dryer and then dried in an oven of 100° C. for 30 minutes to form a dye-receiving layer.

After the lapse of periods of time set forth in Table 1, given later, heat treatments were carried out at 130° C. for 3 minutes to form a release layer. In this manner, the heat transfer image-receiving sheet of the present invention was prepared.

Coating Liquid composed of:

| | |
|---|---|
| Vinyl chloride/vinyl acetate copolymer (#1000A made by Denki Kagaku Kogyo K. K., Japan) | 100 parts |
| Catalyst crosslinking type of silicone (X-62-1212 made by Shin-Etsu Chemical Co., Ltd., Japan) | 10 parts |
| Reaction catalyst (PL 50 T made by Shin-Etsu Chemical Co., Ltd., Japan) | 0.8 parts |
| Epoxy modified silicone (X-22-3000T made by Shin-Etsu Chemical Co., Ltd.) | 10 parts |
| Methyl ethyl ketone/toluene (at a weight ratio of 1:1) | 400 parts |

EXAMPLE 2

Using the following coating liquid in place of that of Ex. 1, Ex. 1 was otherwise repeated to obtain another heat transfer image-receiving sheet.

Coating Liquid composed of:

| | |
|---|---|
| Polyester (Vylon 200 made by Toyobo Co., Ltd., Japan) | 100 parts |
| Epoxy modified silicone (X-22-3000E made by Shin-Etsu Chemical Co., Ltd.) | 7 parts |
| Amino modified silicone (X-22-3050C made by Shin-Etsu Chemical Co., Ltd.) | 7 parts |
| Polymethyl methacrylate grafted with polydimethyl polysiloxane (XA-5016-600Y made by Chisso K. K.) | 4 parts |
| Methyl ethyl ketone/toluene (with a weight ratio of 1:1) | 400 parts |

Comparative Example 1

Using the following coating liquid for that of Ex. 1, a heat transfer image-receiving sheet was obtained for the purpose of comparison.

Coating Liquid composed of:

| | |
|---|---|
| Polyester (Vylon 200 made by Toyobo Co., Ltd.) | 100 parts |
| Epoxy modified silicone (X-22-3000E made by Shin-Etsu Chemical Co., Ltd.) | 9 parts |
| Amino modified silicone (X-22-3050C made by Shin-Etsu Chemical Co., Ltd.) | 9 parts |
| Methyl ethyl ketone/toluene (with a weight ratio of 1:1) | 400 parts |

On the other hand, a dye layer-forming coating liquid consisting of the following ingredients was coated, in an amount of 1.0 g/$m^2$ on dry basis, on an ethylene terephthalate film that was 4.5 μm in thickness and subjected on its back side to heat-resistant treatment with the use of a wire bar, followed by drying. Then, some droplets of a silicone oil (X-41/4003 A made by Shin-Etsu Chemical Co., Ltd., Japan) were added onto and spread over the back side of the film with the use of a dropping pipette for backing coating, thereby obtaining a heat transfer sheet.

| | |
|---|---|
| Disperse dye (Kayaset Blue 714 made by Nippon Kayaku K. K.) | 7 parts |
| Polyvinyl butyral resin (BX-1 made by Sekisui Chemical Co., Ltd.) | 35 parts |
| Methyl ethyl ketone/toluene (with a weight ratio of 1:1) | 90 parts |

Comparative Example 2

Using the following coating liquid for that of Ex. 1, a heat transfer image-receiving sheet was obtained for the purpose of comparison.

Coating Liquid composed of:

| | |
|---|---|
| Vinyl chloride/vinyl acetate copolymer (#1000A made by Denki Kagaku Kogyo K. K., Japan) | 100 parts |
| Catalyst crosslinking type of silicone (X-62-1212 made by Shin-Etsu Chemical Co., Ltd., Japan) | 20 parts |
| Reaction catalyst (PL 50T made by Shin-Etsu Chemical Co., Ltd., Japan) | 1.6 parts |
| Methyl ethyl Ketone/toluene (at a weight ratio of 1:1) | 400 parts |

Comparative Example 3

Using the following coating liquid for that of Ex. 1, a heat transfer image-receiving sheet was obtained for the purpose of comparison.

Coating Liquid composed of:

| | |
|---|---|
| Vinyl chloride/vinyl acetate copolymer (#1000A made by Denki Kagaku Kogyo K. K., Japan) | 100 parts |
| Epoxy modified silicone (X-22-3000T made by Shin-Etsu Chemical Co., Ltd., Japan) | 20 parts |
| Methyl ethyl ketone/toluene (at a weight ratio of 1:1) | 400 parts |

The above heat transfer sheet was overlaid on each of the heat transfer image-receiving sheets according to the present invention and for the purpose of comparison with the dye and dye-receiving layers located in opposition to each other. Then, printing was carried out with a thermal head under the conditions of an output of 1 W/dot, a pulse width of 0.3 to 0.45 msec. and a dot density of 6 dots/mm to form a cyan image, which was in turn permitted to stand for given periods of time to make examination of the releasability of the two layers. The results are shown in Table 1, given below.

TABLE 1

| | Periods of Time | | |
|---|---|---|---|
| | 0–2 days | 3–6 days | 7–15 days |
| Example 1 | good | good | good |
| Example 2 | good | good | good |
| Comp. Ex. 1 | good | no good | bad |
| Comp. Ex. 2 | good | no good | bad |
| Comp. Ex. 3 | bad | bad | no good |

What is claimed is:

1. A heat transfer image-receiving sheet comprising:

a substrate sheet;

a dye-receiving layer formed on at least one side of said substrate sheet; and a release layer formed on the surface of said dye-receiving layer, said release layer consisting essentially of a mixture of a reactive curing release agent and a non-reactive release agent.

2. A heat transfer image-receiving sheet as claimed in claim 1, wherein said reactive curing release agent accounts for 20 to 80% by weight of said mixture.

3. A heat transfer image-receiving sheet as claimed in claim 1, wherein said reactive curing release agent is a release agent which can undergo reaction or react with a curing agent to form a crosslinked film for said release layer and is selected from the group consisting of silicone oil, phosphate base surface active agent and fluorine base surface active agent, all having a functional group.

4. A heat transfer image-receiving sheet as claimed in claim 1, wherein said reactive curing release agent consists essentially of a reactive silicone selected from the group consisting of amino-, epoxy-, isocyanate-, alcohol- and carboxyl-modified silicones.

5. A heat transfer image-receiving sheet as claimed in claim 1, wherein said reactive curing release agent consists essentially of a silicon compound having at least one alkoxysilyl group together with a reactive group.

6. A heat transfer image-receiving sheet as claimed in claim 1, wherein said reactive curing release agent consists essentially of hydrogen polydimethylsiloxane or vinyl polydimethylsiloxane.

7. A heat transfer image-receiving sheet as claimed in claim 1, wherein said nonreactive release agent is selected from the group consisting of silicone oil, phosphate base surface active agent and fluorine base surface active agent, all having no reactive group.

8. A heat transfer image-receiving sheet as claimed in claim 1, further comprising a cushioning layer interposed between said substrate sheet and said dye-receiving layer.

9. An image receiving medium for use in a sublimation thermal image transfer recording system, comprising a substrate, and a dye receiving layer formed thereon, comprising:

(a) a resin which can be dyed with a heat-sublimable dye;

(b) a first release agent comprising a reactive curing release agent selected from the group consisting of a silicone oil, a phosphate base surface active agent and a fluorine base surface active agent, all having a functional group, amino-modified silicone, epoxy-modified silicone, isocyanate-modified silicone, alcohol-modified silicone, carboxyl-modified silicone, hydrogen polydimethylsiloxane and vinylpolydimethylsiloxane; and (c) a second release agent comprising a non-reactive silicone oil.

* * * * *